United States Patent [19]
Lewis et al.

[11] Patent Number: 5,706,436
[45] Date of Patent: Jan. 6, 1998

[54] APPARATUS AND METHOD FOR EVALUATION NETWORK TRAFFIC PERFORMANCE

[75] Inventors: Lundy Lewis, Mason; Utpal Datta, Bedford, both of N.H.

[73] Assignee: Cabletron Systems, Inc., Rochester, N.H.

[21] Appl. No.: 382,294

[22] Filed: Feb. 1, 1995

[51] Int. Cl.$^6$ .................................................. G06F 9/455
[52] U.S. Cl. ............. 395/200.11; 395/500; 364/DIG. 1; 364/264.3; 364/284; 364/284.4
[58] Field of Search ............... 395/200.11, 500; 364/550

[56] References Cited

U.S. PATENT DOCUMENTS

| | | | |
|---|---|---|---|
| 4,484,326 | 11/1984 | Turner | 370/60 |
| 4,792,753 | 12/1988 | Iwai | 324/73 |
| 4,816,767 | 3/1989 | Cannon et al. | 324/58 |
| 5,042,027 | 8/1991 | Takase et al. | 370/54 |
| 5,072,189 | 12/1991 | Openlander | 324/638 |
| 5,276,529 | 1/1994 | Williams | 358/406 |
| 5,375,070 | 12/1994 | Hershey et al. | 364/550 |
| 5,412,753 | 5/1995 | Alston et al. | 395/12 |
| 5,440,719 | 8/1995 | Hanes et al. | 395/500 |
| 5,542,047 | 7/1996 | Armstrong | 395/200.11 |
| 5,572,674 | 11/1996 | Ernst | 395/200.11 |

FOREIGN PATENT DOCUMENTS 0 496 061 A2  7/1992  European Pat. Off. .
0 621 734 A2  10/1994  European Pat. Off. .

OTHER PUBLICATIONS

Haraszti et al., "Plasma—An Integrated Tool For ATM Network Operation," ISS '95 World Telecommunications Congress, vol. 1, pp. 314–318 (Apr. 23–28, 1995, Berlin).

Awerbuch et al., "Sparse Partitions," 31st Annual Symposium On Foundations Of Computer Science, vol. 2, pp. 503–513 (Oct. 22–24, 1990, St. Louis, MO).

Bouloutas et al., "Some Graph Partitioning Problems And Algorithms Related To Routing In Large Computer Networks," The 9th International Conference On Distributed Systems, pp. 362–370 (Jun. 5–9, 1989, Newport Beach, CA).

*Primary Examiner*—Mehmet B. Geckil
*Attorney, Agent, or Firm*—Wolf, Greenfield & Sacks, P.C.

[57] ABSTRACT

Traffic on a communications network is evaluated based on intra-subnet and inter-subnet traffic volumes. Values indicative of such volumes and of the overall network balance are displayed, along with alternative node topologies which may be evaluated and displayed. The overall network performance is based on equalizing intra-subnet traffic volume and minimizing inter-subnet traffic volume.

26 Claims, 7 Drawing Sheets

| 11 | 12 | 13 | 14 | 15 | 16 |
|---|---|---|---|---|---|
| lnth | proto | source | destination | src port | dst port |
| 70 | udp | blue | doc | sunrpc | 709 |
| 94 | udp | blue | doc | 755 | 1844 |
| 98 | udp | nypl | doc | 659 | 868 |
| 122 | udp | nypl | doc | 659 | 868 |
| 82 | udp | nikana | doc | 1017 | 2049 |
| 146 | udp | nypl | doc | 659 | 868 |
| 70 | udp | blue | doc | sunrpc | 710 |
| 94 | udp | blue | doc | 755 | 1844 |
| 62 | icmp | robocop | doc | echo | |
| 102 | udp | nypl | doc | 659 | 868 |
| 70 | udp | blue | doc | sunrpc | 712 |
| 94 | udp | blue | doc | 755 | 1844 |
| 138 | udp | mer-mail | doc | 2049 | 1022 |
| 70 | udp | mer-mail | doc | 2049 | 1022 |

*FIG. 1*

(PRIOR ART)

# APPARATUS AND METHOD FOR EVALUATION NETWORK TRAFFIC PERFORMANCE

FIELD OF THE INVENTION

This invention relates to computer network communications systems, and in particular to mechanisms for evaluating network communications traffic and balance and evaluating alternative node topologies.

BACKGROUND OF THE INVENTION

To evaluate the performance of a communications network, both the network topology and the raw message traffic data are analyzed. Network topology refers to the structure of a network's physical and virtual connections. Generally, a network is made up of physical or logical subnets (segments), where each subnet includes a plurality of nodes (e.g., servers and host computers). The subnets in a network are connected by a network trunk. The performance analysis may include consideration of the network load on various subnets based on number of packets, packet collision rate, packet deferment rate, packet length, and network communication protocols. This information is normally obtained by placing monitors at selected points in the network. These monitors, also called daemons, network monitors, or network analyzers, monitor the traffic that flows through the selected points.

Some current monitors simply report various parameters of network packets in real time. For example, the table of FIG. 1 shows a few seconds of network activity where the parameters of interest are packet length 11, protocol 12, source node 13, destination node 14, source port 15, and destination port 16. However, an analysis of such raw data is rather cumbersome, particularly if the raw data has been collected for days or months. Thus, tools have been built that can transform the raw data into graphical representations such as bargraphs, X-Y plots, histograms, and scatterplots, as shown in FIG. 2.

One particularly useful representation of overall network performance is a topological view of the network showing the amount of traffic flowing among the various nodes, as shown in FIG. 3. When a monitor is initiated, only a bare outer circle 31 (signifying a subnet) is displayed. Then, as the monitor reads packets, it picks out the source and destination nodes 34 recorded in the packet, places the nodes in the outer circle (referenced by name or address), and draws a line 35 between the nodes. Over time, the monitor discovers all of the traffic patterns on the subnet. In addition, it discovers other subnets on the network for which it draws additional outer circles 32, 33 and their internal connections, as well as inter-subnet connections 36. In FIG. 3, the lines 35, 36 may also indicate the amount of traffic between the nodes by, for example, line color or line thickness. Several products representative of this art and their associated companies and addresses are: (1) Netvisualizer, Silicon Graphics Inc., 2011 N. Shoreline Blvd., Mountain View, Calif., 94039; (2) Sniffer, Network General Corporation, 4200 Bohannon Drive, Menlo Park, Calif., 94025; (3) Netmetrix, Hewlett-Packard Corporation, 1 Tara Blvd., Nashua, N.H., 03062; and (4) LANalyzer, Novell Inc., 122 East 1700 South, Provo, Utah, 84606.

However, the prior methods of monitoring network performance as shown for example in FIGS. 1–3, provide only the ability to monitor—they do not provide the ability to evaluate alternative network topologies or to perform comparison studies. In addition, the previous methods do not show the overall balance of traffic on a network.

One feature of the present invention is to evaluate the overall balance of network traffic.

Another feature is to evaluate overall network performance based on equalizing intra-subnet activity and minimizing trunk traffic.

Still another feature is to evaluate and display alternative node topologies.

SUMMARY OF THE INVENTION

The present invention includes a method and apparatus for evaluating the overall balance of traffic on a communications network, which network includes a plurality of subnets. Both inter-subnet traffic volume 95 and intra-subnet traffic volume 96 are measured (see FIG. 10), and in one embodiment normalized with respect to the total traffic volume. An overall balance factor of the network is then determined. The traffic volume measured may be for example the total quantity of packets over a time interval, or the total quantity of bits over a time interval.

In one embodiment, the overall balance factor is equal to the sum of a subnet traffic equalization factor and a trunk minimization factor. The goal is to equalize the amount of traffic on each subnet to the extent possible, and approach a desired minimum level of traffic on the trunks.

Additionally, alternative network topologies may be evaluated without actually modifying the network. The balance of each alternative topology may be defined and displayed.

Further embodiments include a computer for performing the functions of the above embodiments, or a memory for providing instructions to a computer to perform these functions.

The invention will be more particularly described with respect to the following figures and detailed description.

BRIEF DESCRIPTION OF THE FIGURES

FIG. 1 is a table of raw traffic data from a prior art monitor.

DETAILED DESCRIPTION

Figure 4:
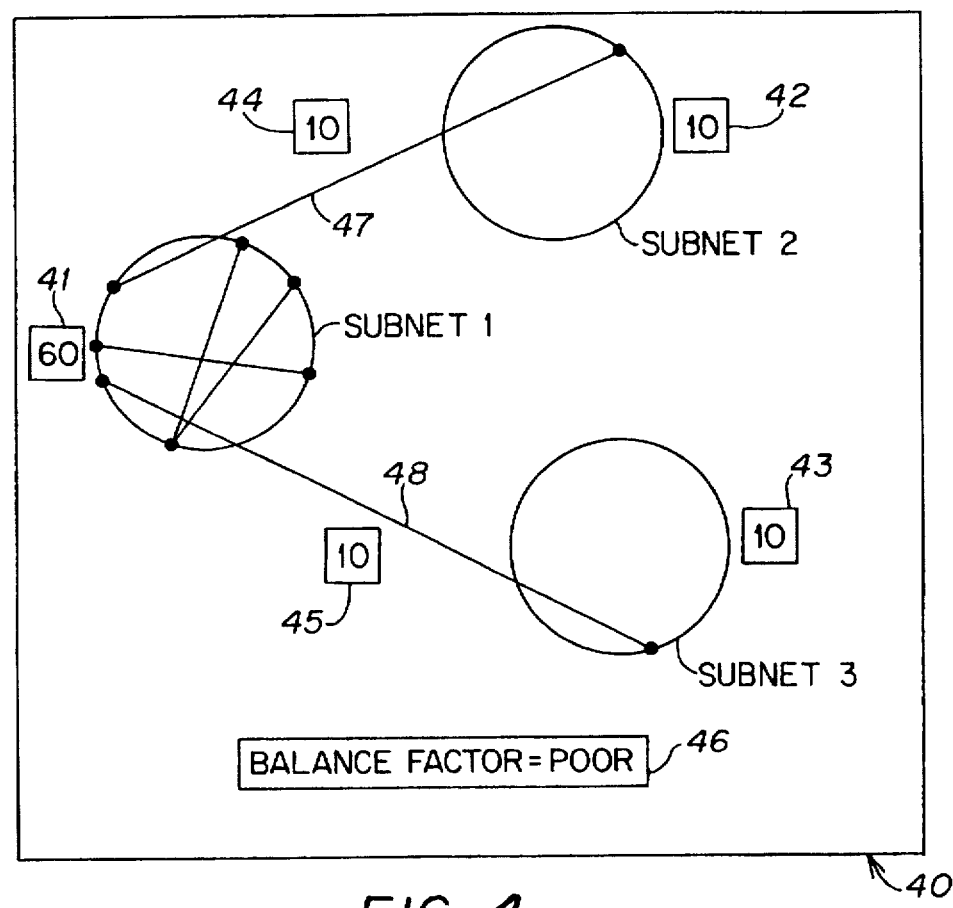
FIG. 4 is a graphical display in accordance with the present invention, showing values representative of network balance.

According to one embodiment of the present invention, the current overall network balance is displayed on a graphical screen as shown in FIG. 4. A display 40 includes icons which indicate that subnet 1 comprises 60% of total network traffic volume (icon 41), while subnets 2 and 3 each comprise 10% of total network traffic volume (icons 42 and 43, respectively). Furthermore, icons 44 and 45 indicate that the trunk 47 connecting subnet 1 and subnet 2, and the trunk 48 connecting subnet 1 and subnet 3, each comprise 10% of the total network traffic volume. As explained below, this is an example of what may be classified as a "poorly" balanced network, as indicated by icon 46.

Figure 5:
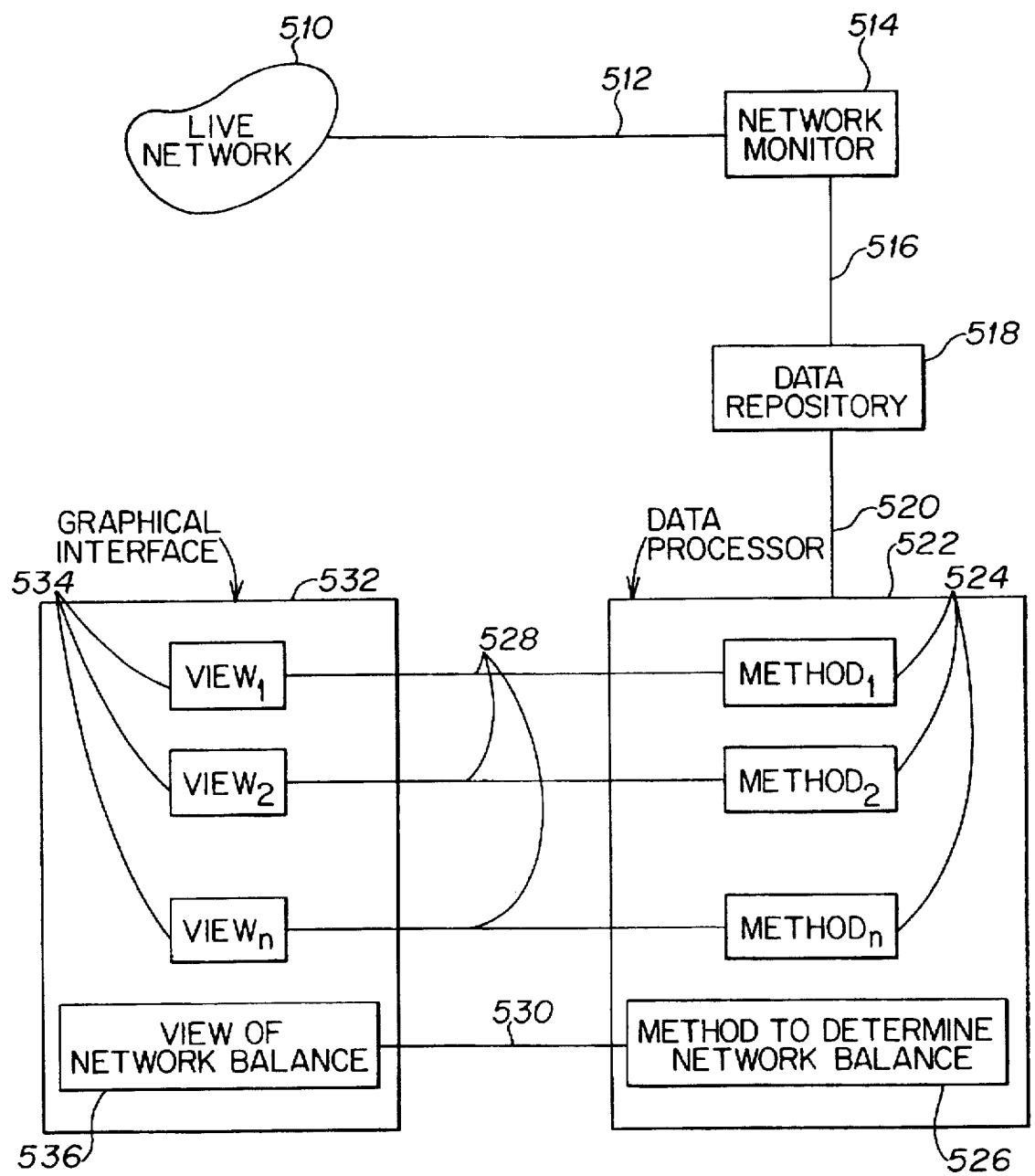
FIG. 5 is a block diagram illustrating an embodiment of the apparatus of the present invention in which network traffic is monitored and displayed.

FIG. 5 shows an apparatus for generating the display of FIG. 4. FIG. 5 shows a network monitor 514 which monitors a live network 510 via a communication link 512 over a period of time and passes the resulting network parameter data to a data repository 518 via a communication link 516. Data processor 522 accesses this accumulated data from the data repository 518 via a communication link 520.

The present embodiment includes a "network monitor" as the primary means to collect network data. Examples of suitable network monitors include the following network management systems: 1) Sniffer, Network General Corporation, 4200 Bohannon Drive, Menlo Park, Calif. 94025; 2) NetMetrix, Hewlett-Packard Corporation, 1 Tara Boulevard, Nashua, N.H. 03062; 3) LANalyzer, Novell, Inc., 122 East 1700 South, Provo, Utah 84606-6194; and 4) Spectrum™ Network Management System, Cabletron Systems, Inc., Rochester, N.H. In addition, the network monitor may include basic low-level programs such as "Etherfind" on Sun workstations, or "Netsnoop" on Silicon Graphics IRIX workstations.

Figure 2:
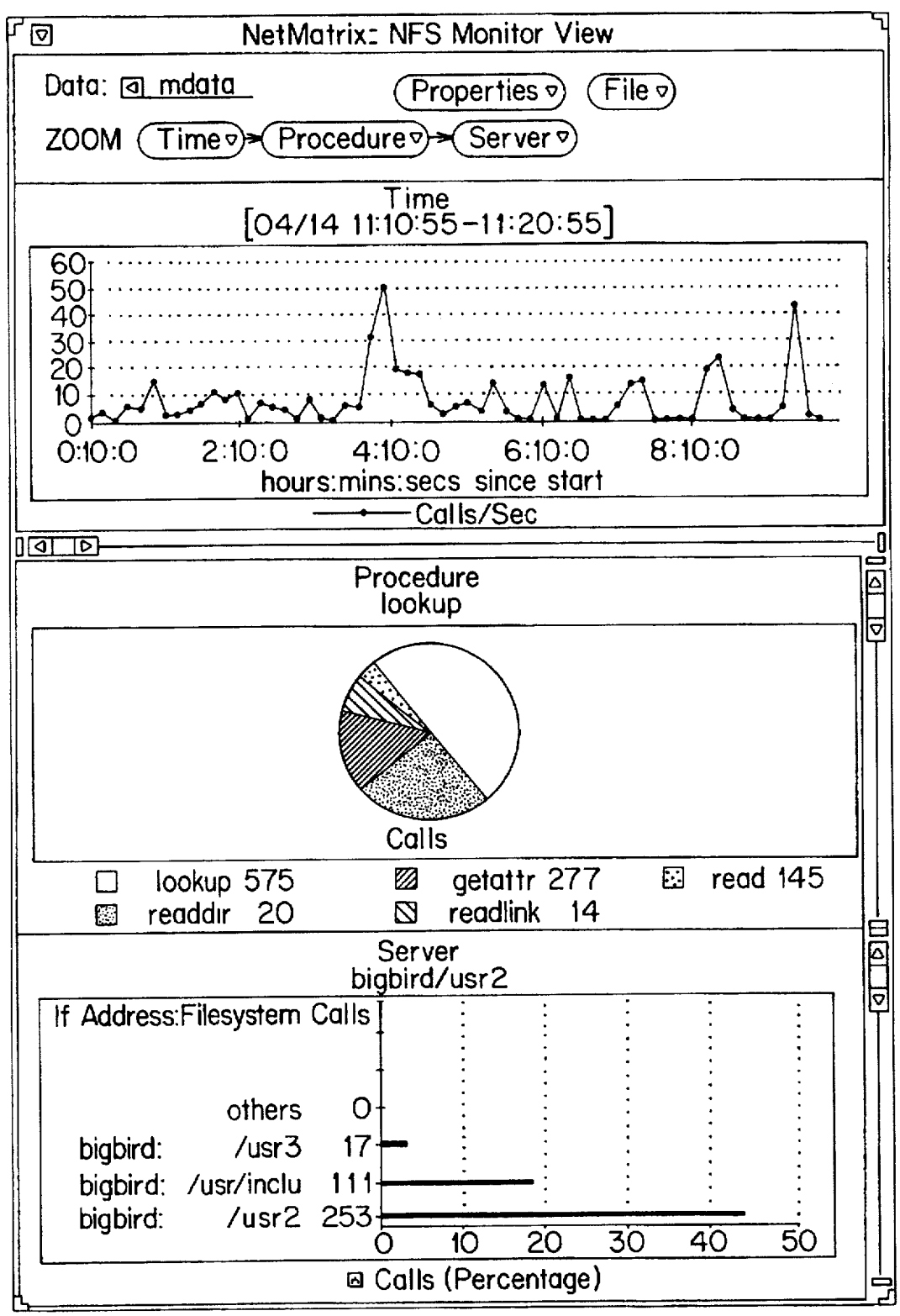
FIG. 2 is a prior art graphical display with various representations of network traffic.
Figure 3:
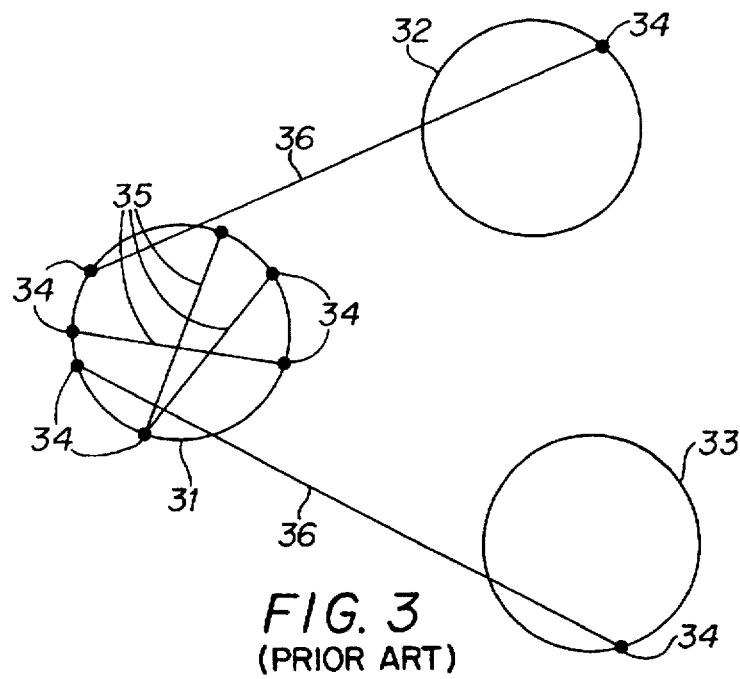
FIG. 3 is a prior art graphical display showing network traffic with respect to inter-subnet and intra-subnet activity.

Streams of data (of the type shown in FIG. 1) accumulate in the data repository 518 over time. Data processor 522 accesses the data in data repository 518 in order to transform the data into useful graphical representations of network performance in the graphical interface 532. Method$_1$, method$_2$, ..., method$_n$ (collectively 524) refer to existing methods of transforming the data in data repository into view 1, view 2 ... view$_n$ (collectively 534) via communication links 528. These views are, for example, those shown in FIGS. 2–3. The present invention comprises a new method and a new view, in particular a "method to determine network balance" 526, a "view of network balance" 536, connected by communication link 530.

One feature of the present invention is to evaluate a network as a dynamic system comprising pockets of traffic volume. In this instance, traffic volume is the amount of traffic in a particular location on the network. A network monitor can measure the amount of traffic occurring on any particular subnet at the exclusion of traffic on the rest of the network. Likewise, a monitor can measure the amount of traffic that occurs over a trunk between two subnets at the exclusion of the traffic occurring within the subnets themselves.

Figure 6:
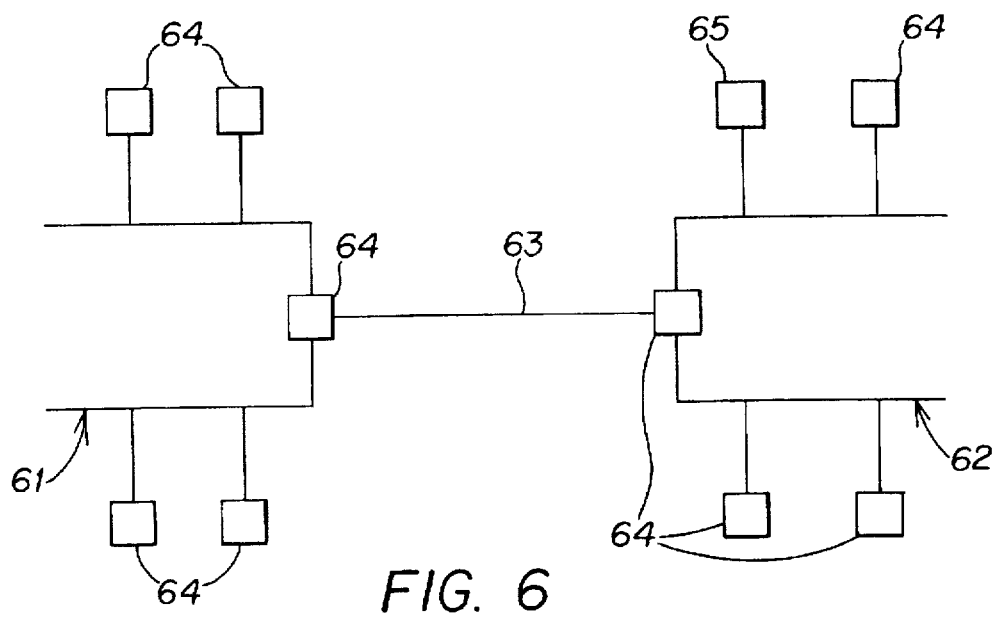
FIG. 6 illustrates the topology of a sample network.

Therefore, the traffic on a particular subnet may be represented as a part that contributes to the sum total of overall network traffic volume. Similarly, the traffic on each trunk also may be represented as a part of the total network traffic volume. This concept is similar to considering a partial traffic volume to represent a partial energy of an entire energy of a network, where the entire energy is represented by the total traffic volume. FIG. 6 illustrates this concept.

FIG. 6 shows two subnets 61 and 62 and a trunk 63 connecting them. Each subnet 61, 62 has several hosts 64 which generate the traffic being monitored. There may also be a server 65 on subnet 62. A process ε maps the traffic on each of subnets 61 and 62, and trunk 63 to representative traffic volumes x, y, and z respectively. In this instance, the process ε may represent the average amount of traffic over a time interval. The amount of traffic may be the quantity of packets, or it may further include parameters such as packet retries or packet size in the determination of traffic volume. As a result:

ε(subnet 61)=x
ε(subnet 62)=y
ε(trunk 63)=z

If the total network traffic volume is normalized to a scale of 1 to 100, then x+y+z=100. The values for x, y, and z are displayed as text such as that exemplified in FIG. 4 (icons 41–43), or alternatively may be displayed graphically, e.g. as bargraphs, x-y plots, etc. (of the type shown in FIG. 2).

In order to optimally balance a network, the objectives are generally to minimize traffic flow over network trunks (inter-subnet traffic) and substantially equalize traffic occurring within each subnet (intra-subnet traffic). In some instances, instead of minimizing inter-subnet traffic to an absolute minimum, it may be preferable to cause the inter-subnet traffic to approach a predefined minimum that is greater than zero, e.g., 10%. An important result of this invention derives from the fact that the more balanced the network is, the better the network will perform. A better performing network may decrease packet deferment rate, for example, or decrease the number of relays required.

The following example illustrates these principles. For a particular time interval, the result of inter-subnet and intra-subnet monitoring is as follows, with respect to FIG. 6:

ε(subnet 61)=50%
ε(subnet 62)=15%
ε(trunk 63)=35%

In such an instance, it is possible that most of the network traffic on subnet 61 is due to hosts on subnet 61 that access server 65 on subnet 62. If the network were reconfigured so that server 65 were on subnet 61 (instead of subnet 62), the resulting traffic volumes may change as follows:

ε(subnet 61) =50%
ε(subnet 62) =40%
ε(trunk 63)=10%

The latter balance is more optimal than the former. For example, although the total percentage of traffic volume remains at 100%, it may be that the packet deferment rate has decreased, or that less relays were required. Since balance translates into network performance, the latter configuration will perform better than the former.

In addition, the invention provides a framework for comparing the performances of alternative network topologies without actually reconfiguring a network. If a metric of network performance is defined as the substantial equalization of intra-subnet traffic and minimization of inter-subnet traffic, then this metric may be used to compare the performance of an existing network to possible future networks. The possible networks are often "near-neighbor" networks—modified slightly from the network's original topology, for example, by relocating some of the nodes of the network.

Figure 7:
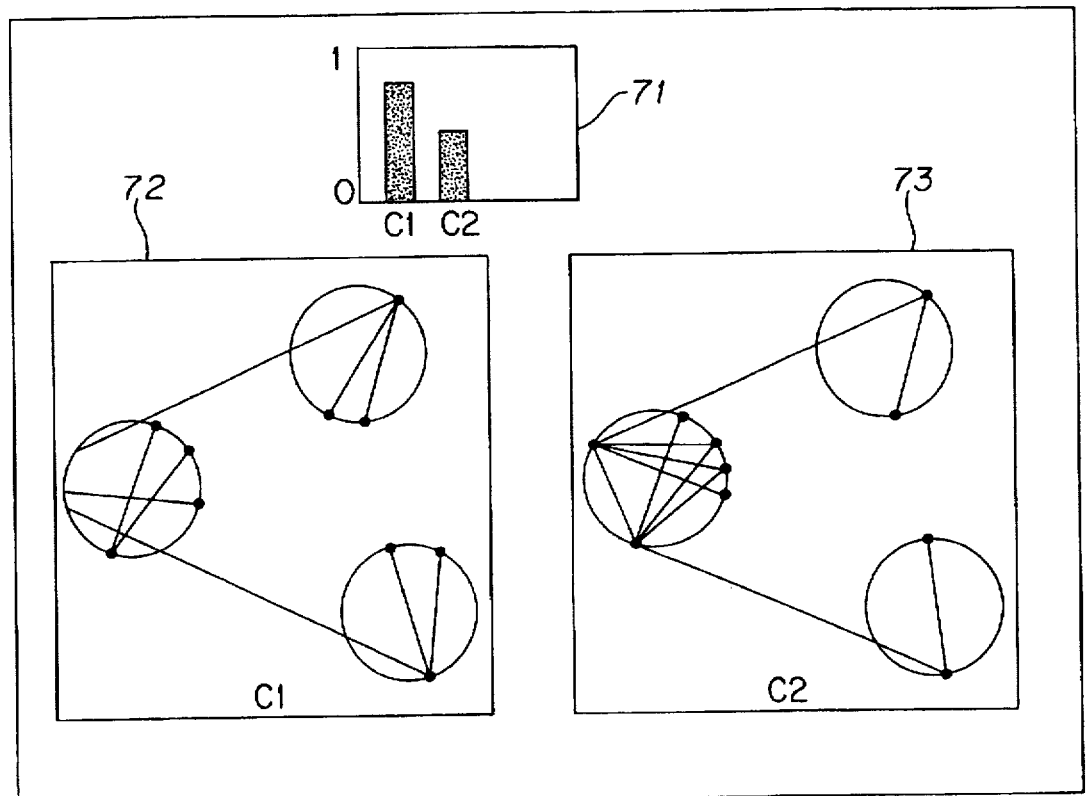
FIG. 7 illustrates a display comparing an alternative topology in accordance with one embodiment of this invention.

FIG. 7 illustrates one display 70 for viewing the network balance of alternative network topologies. In this example, a bargraph 71 provides an overall balance factor (normalized over a range of 0 to 1) for two alternative topologies, labeled C1 and C2. In this case, C1 has the higher (preferred) balance factor. The network topologies of C1 and C2 are illustrated in displays 72 and 73, respectively.

As a further example, a metric for subnet equalization may be the variance or standard deviation of the sample (of subnet traffic volumes), i.e.:

$$\text{degree of subnet equalization} = \sqrt{\frac{\Sigma(X_i)^2}{N} - \bar{x}^2}$$

where $X_i$ is the traffic volume of subnet i, where i=1 ... N;

N is the number of subnets monitored; and $\bar{x}$ is the average subnet traffic volume.

The ideal traffic volume for a trunk may be, for example, one tenth (10%) of the sum of the traffic volumes of the subnets that are connected to the trunk. For example, in FIG. 6, if subnet 61 had a normalized traffic volume of 20 and subnet 62 had a normalized traffic volume of 30, then an ideal normalized traffic volume for the trunk 63 would be 5 ((20+30)+10=5). The overall balance factor may then combine an intra-subnet equalization factor with an inter-subnet minimization factor. In one embodiment, in which a higher overall balance factor represents a preferred network architecture, the overall balance factor would be the inverse of the subnet equalization metric described above, added to the inverse of the total traffic volume of trunks on the network. Other embodiments may have a different balance factor, for example one which would be proportional to the proximity of the inter-subnet activity to a predefined minimum that is greater than zero.

Figure 8:
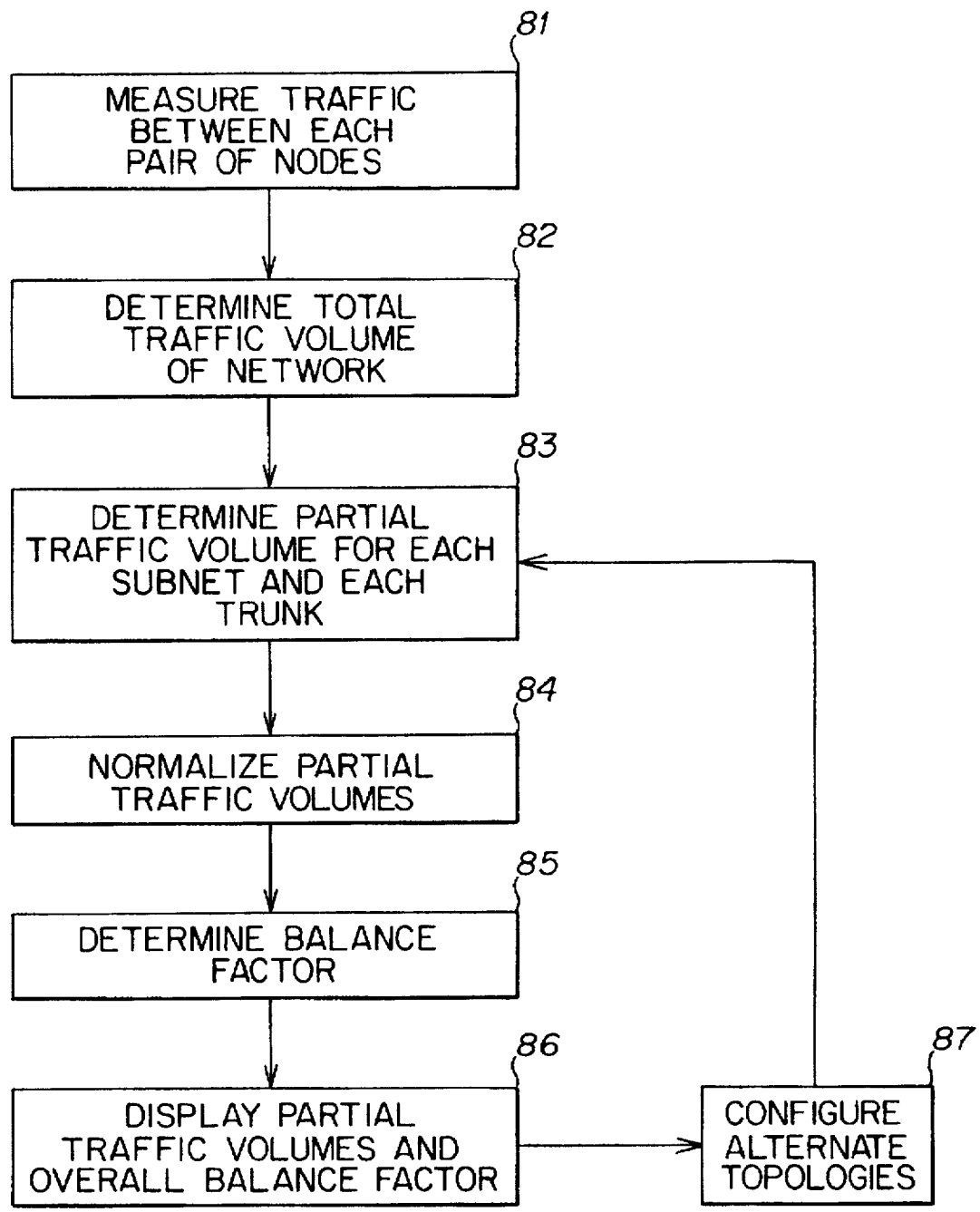
FIG. 8 is a flow chart of a method for analyzing and displaying network traffic according to one embodiment of the invention.

FIG. 8 illustrates generally the method of this invention. Step 81 measures the traffic between each pair of nodes on a network. Step 82 sums the traffic measured in step 81 to determine the total traffic volume of the network. Step 83 determines the partial traffic volume for each subnet (intra-subnet activity) as well as partial traffic volume for each trunk (inter-subnet activity). Step 84 normalizes these traffic volumes, so that the total traffic volume is 100%, and step 85 determines the network balance factor. Step 86 displays the partial traffic volumes and balance factor (as for example in FIG. 4). If alternative topologies are to be evaluated, either by a user or an external device, step 87 configures these alternative topologies, and repeats steps 83–86 for each topology. The resulting display would show such alternatives (as for example in FIG. 7).

The invention allows an external device or user to experiment with alternative network topologies, in order to determine the resulting balance of the alternative topologies. For example, in FIG. 4, the external device or user might drag (reposition) two nodes from subnet 1 to subnet 2, and then observe and evaluate the resulting balance and the overall balance factor for the entire network. This allows comparative studies on alternative network configurations in real time.

Figure 9:
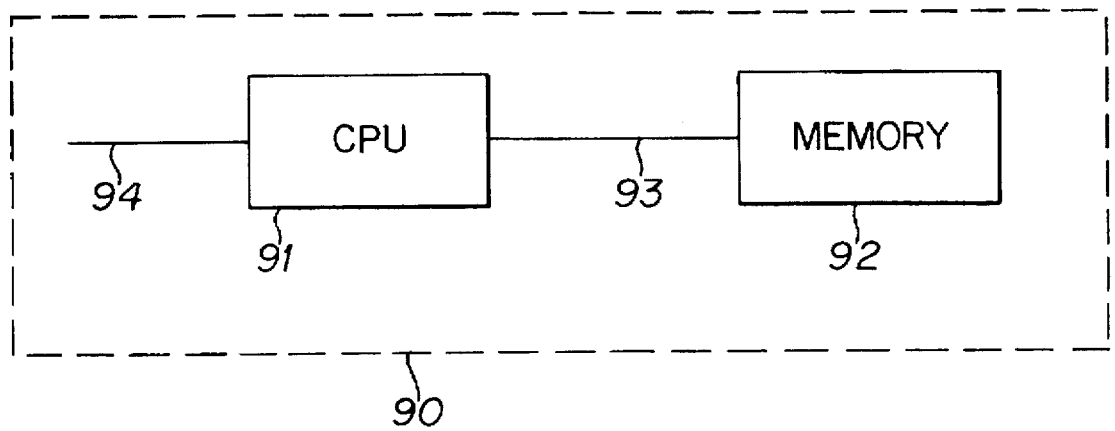
FIG. 9 is a block diagram of a computer apparatus and memory for alternative embodiments.
Figure 10:
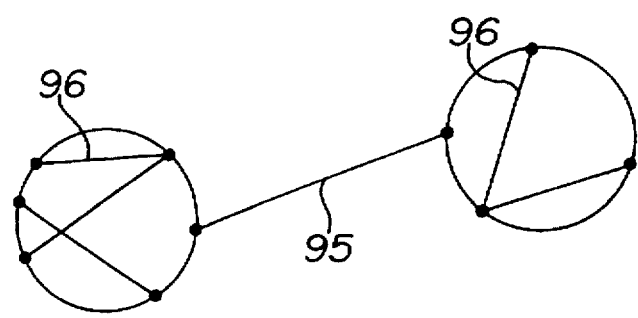
FIG. 10 is a schematic diagram illustrating intra-subnet traffic versus inter-subnet traffic.

Any of the above embodiments may be implemented in a general purpose computer 90 as shown in FIG. 9. This general purpose computer 90 may include a Computer Processing Unit (CPU) 91, memory 92, a processing bus 93 by which the CPU can access the memory 92, and access to a network 94.

The invention may be a computer apparatus which performs the functions of any of the previous embodiments. Alternatively, the invention may be a memory 92, such as a floppy disk, compact disk, or hard drive, that contains a computer program or data structure, for providing to a general purpose computer instructions and data for carrying out the functions of the previous embodiments.

Having thus described several particular embodiments of the invention, various modifications and improvements will readily occur to those skilled in the art. Accordingly, the foregoing description is by way of example only, and not intended to be limiting.

What is claimed is:

1. A method for evaluating network traffic on a communications network, the network having a topology of subnets connected by trunks and each of the subnets having at least one node, the method comprising the steps of:

measuring intra-subnet traffic volumes between nodes of a subnet for each of the subnets;

measuring inter-subnet traffic volumes between nodes of different subnets for each of the trunks; and determining an overall balance factor of the network based on at least one of: 1) a substantial equalization of the intra-subnet traffic volumes; and 2) a substantial minimization of the inter-subnet traffic volumes.

2. The method of claim 1 wherein the overall balance factor is determined based on both factors 1) and 2).

3. The method of claim 1, further including the step of:

displaying the network topology and each of the intra-subnet traffic volumes, inter-subnet traffic volumes, and balance factor.

4. The method of claim 1, wherein the determining step includes:

determining a total traffic volume to be a sum of the intra-subnet traffic volumes and inter-subnet traffic volumes; and normalizing each of the intra-subnet traffic volumes and inter-subnet traffic volumes with respect to the total traffic volume.

5. The method of claim 4, wherein the overall balance factor is inversely proportional to a standard deviation of the normalized intra-subnet traffic volumes.

6. The method of claim 4, wherein the overall balance factor is inversely proportional to a standard deviation of the normalized inter-subnet traffic volumes.

7. The method of claim 1, wherein the step of determining an overall balance factor includes the steps of:

normalizing each of the intra-subnet traffic volumes and inter-subnet traffic volumes with respect to the total traffic volume;

determining a subnet traffic equalization factor to be a standard deviation for the normalized intra-subnet traffic volumes;

determining a trunk minimization factor to be an inverse of a sum of the normalized inter-subnet traffic volumes; and determining the overall balance factor to be the sum of the subnet traffic equalization factor and the trunk minimization factor.

8. The method of claim 1, wherein:

the steps of measuring intra-subnet and inter-subnet traffic volumes comprises measuring quantities of packets during a first time interval.

9. The method of claim 1, wherein:

the steps of measuring intra-subnet traffic volumes comprises measuring quantities of bits.

10. The method of claim 1, further including the steps of:

determining intra-subnet traffic volumes for an alternative topology;

determining inter-subnet traffic volumes for the alternative topology; and determining an overall balance factor for the alternative topology.

11. The method of claim 10, wherein the alternative topology is determined by moving at least one a node from a first subnet to a second subnet.

12. The method of claim 10, further including the steps of:

displaying the network topology and alternative network topology and each of their respective intra-subnet traffic volumes, inter-subnet traffic volumes and balance factors.

13. An apparatus for evaluating network traffic on a communications network, the network having a topology of subnets connected by trunks and each of the subnets having at least one node, the apparatus comprising:

a monitor for measuring intra-subnet traffic volumes between nodes of a subnet for each of the subnets;

the monitor also measuring inter-subnet traffic volumes between nodes of different subnets for each of the trunks; and a processor for determining an overall balance factor of the network based on at least one of: 1) a substantial equalization of the intra-subnet traffic volumes; and 2) substantial minimization of the inter-subnet traffic volumes.

14. The apparatus of claim 13, wherein the processor determines the overall balance factor based on both factors 1) and 2).

15. The apparatus of claim 13, further comprising:

means for displaying the network topology and each of the intra-subnet traffic volumes, inter-subnet traffic volumes, and balance factor.

16. The apparatus of claim 13, wherein the processor includes:

means for determining a total traffic volume to be a sum of the intra-subnet traffic volumes and inter-subnet traffic volumes;

means for normalizing each of the intra-subnet traffic volumes and inter-subnet traffic volumes with respect to the total traffic volume; and means for determining the overall balance factor based on both of the normalized traffic volumes.

17. The apparatus of claim 13, further comprising:

means for determining intra-subnet traffic volumes for an alternative topology;

means for determining inter-subnet traffic volume for the alternative topology; and means for determining the overall balance factor for the alternative topology.

18. The apparatus of claim 17, further including:

means for displaying the and alternative network topologies and each of their respective intra-subnet traffic volumes, inter-subnet traffic volumes, and balance factors.

19. The method of claim 10, further comprising a step of comparing the overall balance factor for the alternative topology with the overall balance factor of the network to determine a preferred topology for the network.

20. The method of claim 10, further comprising a step of reconfiguring the network to the alternative topology based upon a comparison of the overall balance factor for the alternative topology with the overall balance factor of the network.

21. The method of claim 1, further comprising the steps of:

determining a balance factor for a first alternative topology for the network;

determining a balance factor for a second alternative topology for the network; and selecting a preferred one of the first and second alternative topologies based upon a comparison of the balance factor for a first alternative topology with the balance factor for a second alternative topology.

22. The method of claim 1, wherein the communications network is a live network.

23. The apparatus of claim 17, further comprising means for comparing the overall balance factor for the alternative topology with the overall balance factor of the network to determine a preferred topology for the network.

24. The apparatus of claim 17, further comprising means for reconfiguring the network to the alternative topology based upon a comparison of the overall balance factor for the alternative topology with the overall balance factor of the network.

25. The apparatus of claim 13, further comprising:

means for determining a balance factor for a first alternative topology for the network;

means for determining a balance factor for a second alternative topology for the network; and means for selecting a preferred one of the first and second alternative topologies based upon a comparison of the balance factor for a first alternative topology with the balance factor for a second alternative topology.

26. The apparatus of claim 13, wherein the communications network is a live network.

* * * * *

UNITED STATES PATENT AND TRADEMARK OFFICE
CERTIFICATE OF CORRECTION

PATENT NO. : 5,706,436
DATED : January 6, 1998
INVENTOR(S) : Lewis et al.

It is certified that error appears in the above-identified patent and that said Letters Patent is hereby corrected as shown below:

Col. 5, line 16. — delete "((20+30) + 10 = 5"

and substitute

-- $((20+30) \div 10 = 5)$ --.

Signed and Sealed this

Twenty-eighth Day of April, 1998

Attest:

BRUCE LEHMAN

Attesting Officer

Commissioner of Patents and Trademarks